Sept. 26, 1939.   A. J. ANDERSON ET AL   2,174,304
EYEGLASS WITH EDGE FOR COSMETIC EFFECT
Original Filed Jan. 23, 1937
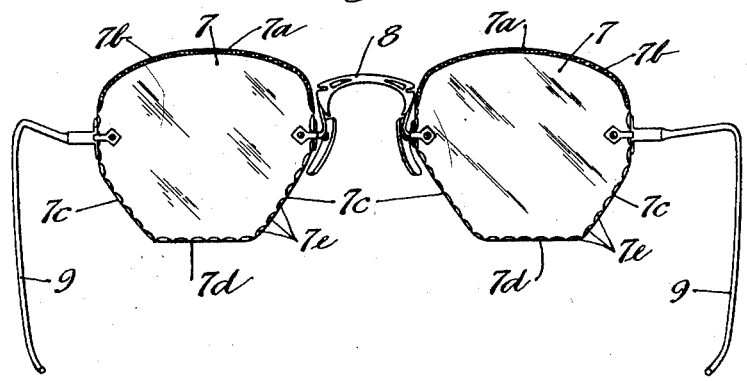
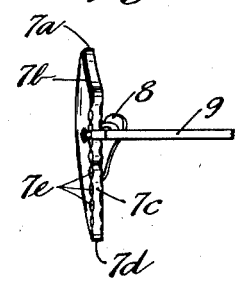
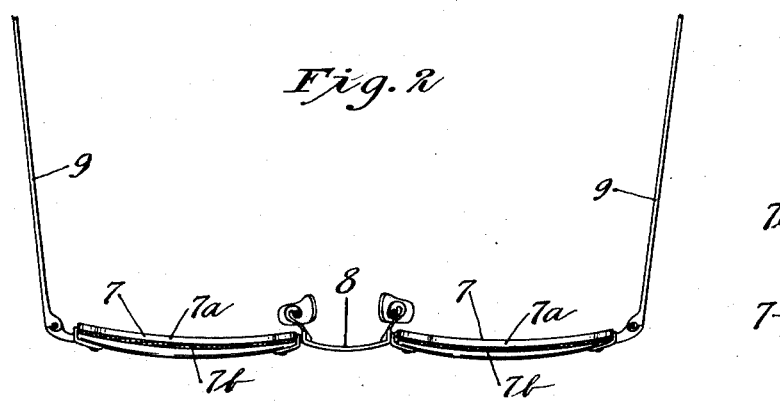
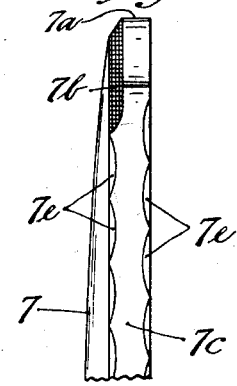
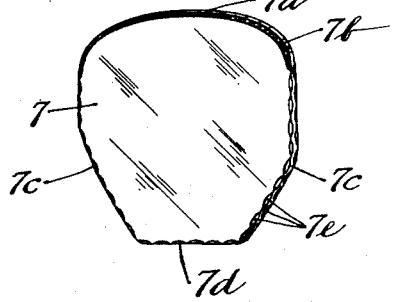
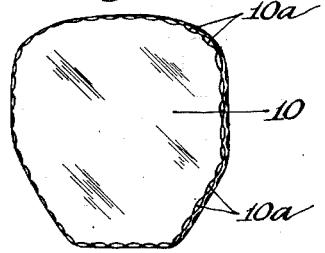
Inventors
Albert J. Anderson
James G. Wescott
By Williamson & Williamson
Attorneys Patented Sept. 26, 1939

2,174,304

UNITED STATES PATENT OFFICE

2,174,304

EYEGLASSES WITH EDGES FOR COSMETIC EFFECT

Albert J. Anderson and James G. Wescott, Minneapolis, Minn., assignors to N. P. Benson Optical Company, Inc., Minneapolis, Minn., a corporation of Delaware Substitute for abandoned application Serial No. 122,025, January 23, 1937. This application February 2, 1938, Serial No. 188,348

4 Claims. (Cl. 88—54)

This application is a substitution for our abandoned application Serial No. 122,025, filed January 23, 1937.

Our invention relates to spectacles and eye glasses and particularly to construction of lenses therefor.

Many wearers of eye glasses and spectacles dislike glasses which are conspicuous and desire glasses of as near an invisible nature as possible. Aside from the mountings for eye glasses and spectacles, the edges of the lenses usually constitute the most conspicuous parts.

A general object of our invention is to provide lenses for eye glasses and spectacles wherein the edges are rendered much less visible than the polished, ground or beveled edges conventionally known at this time.

The ordinary ground edge diffuses light in all directions so that it is plainly visible from all angles. The observer of a polished edge, whether beveled or unbeveled, receives intense light reflections in certain positions with respect to the light source, and consequently such edges are very conspicuous.

It is an object of our invention to construct the edges of a lens so that light reflection when observed at all takes the form of a broken or intermittent line instead of the solid line of the ordinary edge reflections, and provides a degree of camouflage which makes the lens edge much less noticeable to the observer.

A more specific object is to provide a lens having an edge shaped and colored in portions to blend with the eyebrows of a wearer and shaped in other portions to diffuse light reflected therefrom so that the entire edge is rendered substantially invisible.

These and other objects and advantages of the invention will be more fully set forth in the following description made in connection with the accompanying drawing, in which like reference characters refer to similar parts throughout the several views, and in which:

Fig. 1 is a front view of a pair of eye glasses wherein a form of our invention is embodied;

Fig. 2 is a top view;

Fig. 3 is a side view;

Fig. 4 is an enlarged scale, partial side view of one of the lenses of Figs. 1, 2 and 3;

Fig. 5 is a front perspective view of the lens of Figs. 1, 2 and 3; and

Fig. 6 is a front perspective view of a slightly different form of my lens.

Referring to the drawing, our eye glass lenses 7 are shown in Figs. 1 to 3, inclusive, as associated in the usual manner with a nose piece 8 and ear engaging pieces 9 of conventional construction. The lenses 7, as shown in Figs. 1, 2 and 3, are also shown in Figs. 4 and 5. The curvature of the upper edge is made to match the curvature of a wearer's eyebrow line, whereby the upper edge portion 7a of the lens 7 will be disposed in front of the wearer's eyebrow throughout substantially the entire length of the upper edge portion 7a. In accordance with our invention, the upper edge portion 7a is darkened to match a wearer's eyebrow by suitable means, such as applying a suitably colored lacquer or enamel. We have found it preferable to also bevel the forward upper corner of the upper edge portion 7a of the lens 7. Suitably colored material, such as lacquer or enamel, is applied to the beveled portion 7b to darken the same, as shown in Fig. 4.

With the upper edge portion of the lens 7 curved to match the curvature of the eyebrow of the wearer and colored to match the coloring of the wearer's eyebrow, the upper portion 7a will merge with the wearer's eyebrow and become in effect invisible.

Our lens 7 is also arranged in such manner that the side and lower edge portions 7c and 7d are rendered relatively inconspicuous. We accomplish this result by so forming the edges 7c and 7d that the same will diffuse light reflected therefrom, as, for example, by roughening the edges 7c and 7d so that light reflected therefrom will be broken up into rays reflected in a multitude of directions. We have found it very effective to form the edges 7c and 7d into a series of small surfaces 7e, facing in various directions, that is at various angles with respect to the plane in which the lens 7 is disposed. The surfaces 7e function in the manner of facets and break up light reflected from the edges 7c and 7d into relatively small beams of light extending at various angles.

From the above it should be apparent that the darkened upper edge portion 7a of the lens 7 will optically merge with the wearer's eyebrow and that the remaining edge portions 7c and 7d are blurred or obscured by light diffusion whereby the lens edge portions 7a, 7b and 7c cooperate to render the entire peripheral edge of the lens inconspicuous to a degree closely approaching invisibility.

Beveling of the forward upper corner of the upper edge portion 7a of the lens 7, as described, provides a thin upper edge and brings the darkened portion of the upper edge close to the rear side of the lens.

The upper edge 7a of our lens may, if desired, be made with greater or less arch than the wearer's eyebrows so as to increase or decrease the apparent degree of arch of flatly arched or excessively arched eyebrows. It is apparent that the optical illusion created in this manner is of value in producing a desirable cosmetic effect.

Fig. 6 shows a lens 10 of somewhat different form, whereof the entire peripheral edge is provided with variously facing surfaces 10a functioning in the same manner as the surfaces or facets 7e, shown in Figs. 4 and 5.

Referring to the form of our lens shown in Figs. 1 to 5 inclusive, it is seen that the peripheral edge of the lens is divided into one portion which is beveled and darkened and another portion which is forming into surfaces or facets 7e. It is to be noted that the proportionate parts of the entire periphery of the lens 7 may be divided between the beveled and darkened construction and the facet construction in any desired ratio.

We have constructed eye glass and spectacle lenses in accordance with the above described construction and have found that the same are very inconspicuous when worn and for all intents and purposes are nearly invisible in effect.

It is apparent that we have invented a novel, practical, effective and inexpensive type of eye glass lens construction which renders the lenses practically invisible.

In the claims hereinafter appended, the term "eye glass lens" or its equivalent, is to be construed to apply to all types of eye glass and spectacle lenses.

It will, of course, be understood that various changes may be made in the form, details, proportions and arrangements of the various parts without departing from the scope of our invention.

What is claimed is:

1. An eye glass lens having the front surface of its edge portion and its circumferential edge provided with a series of very small contiguous facets variously angled with respect to the general plane of the lens and having the rear surface of its edge portion, and its circumferential provided with a second series of very small contiguous facets angled oppositely with respect to the general plane of the lens, whereby light reflected by said several facet surfaces is diffused to render the edge portions relatively inconspicuous to an observer.

2. An eye glass lens having an upper edge curved to substantially correspond in shape to the curvature of the eyebrow line of a wearer and colored to substantially match the color of said eyebrow, said lens having front and rear faces and a surrounding edge portion, the sides and bottom of said portion being provided with a multiplicity of elongated contiguous surfaces, said surfaces extending into said edge and the front face of said lens and being of relatively very small area and disposed at various angles to the general plane of said lens, whereby light reflected by said surfaces is diffused and said edge portion rendered relatively inconspicuous to an observer.

3. An eyeglass lens having front and rear faces and a surrounding edge portion, said edge portion being provided with a multiplicity of elongated contiguous surfaces, said surfaces extending into said edge and the front face of said lens and being of relatively very small area and disposed at various angles to the general plane of said lens, whereby light reflected by said surfaces is difused and said edge portion rendered relatively inconspicuous to an observer.

4. An egeglass lens having front and rear faces and a surrounding edge, said edge portion being provided with a series of contiguous surfaces extending into said edge and also the front face of said lens, and being of relatively very small area and disposed at various angles to the general plane of said lens, said edge being further provided with a similar series of very small surfaces extending into said edge and also into the rear face of said lens, and staggered in relation to said first mentioned series and angled oppositely relative to said first mentioned series with respect to the general plane of the lens, whereby light rays reflected by said several surfaces are greatly diffused and said edge portion rendered relatively inconspicuous to an observer.

ALBERT J. ANDERSON.
JAMES G. WESCOTT.